United States Patent [19]

Tatsumi

[11] Patent Number: 4,594,640
[45] Date of Patent: Jun. 10, 1986

[54] VARIABLE CAPACITOR
[76] Inventor: Tetsuo Tatsumi, 307 Shinshimoemori-cho, Fukui-shi, Fukui-ken, Japan
[21] Appl. No.: 645,752
[22] Filed: Aug. 30, 1984
[30] Foreign Application Priority Data
Mar. 27, 1984 [JP] Japan .............................. 59-44664[U]
[51] Int. Cl.$^4$ ................................................ H01G 5/06
[52] U.S. Cl. .................................................. 361/293
[58] Field of Search ........................ 361/277, 292, 293
[56] References Cited
U.S. PATENT DOCUMENTS 2,205,816  6/1940  Hartzell ........................... 361/277 X
4,242,716  12/1980  Johanson et al. ................ 361/293 X
4,283,751  8/1981  Tatsumi .......................... 361/292 X
4,292,660  9/1981  Tatsumi ............................. 361/293

*Primary Examiner*—Donald A. Griffin

[57] ABSTRACT

Disclosed herein is a variable capacitor in sealed structure having the following construction: Within an insulating case being opened at one side, a stator electrode and a rotor electrode are arranged in a state being opposed to each other through a dielectric plate. The rotor electrode is formed in one surface of a metal rotor rotatably arranged within the insulating case. The other surface of the metal rotor is directed toward the opening of the insulating case, on which other surface an adjusting groove is formed and a ring-shaped base portion of a resilient presser member is arranged in a state not obstructing the adjusting groove. Spring portions extend from the base portion of the resilient presser member, to be in contact with the other surface of the metal rotor. An annular sealing member is fixedly provided in the base portion of the resilient presser member. The sealing member encloses the spring portions, to be in contact with the metal rotor in the vicinity of the outer peripheral portion of the other surface thereof as well as the inner peripheral surface of the insulating case.

11 Claims, 7 Drawing Figures

VARIABLE CAPACITOR

BACKGROUND OF THE INVENTION

The present invention relates to a variable capacitor, and more particularly, it relates to sealed structure in a variable capacitor.

DESCRIPTION OF THE PRIOR ART

Generally, a variable capacitor has an element to be rotatably retained such as a metal rotor, which is rotated by external operation. Therefore, even if such variable capacitor is contained in an insulating case, the insulating case must inevitably be provided with an opening. Further, since provision of an element, such as the metal rotor, to be moved in the insulating case is necessarily required, gaps must be defined within the insulating case for allowing movement of the element such as the metal rotor. These gaps communicate with the aforementioned opening of the insulating case, to disturb sealing effect within the insulating case.

Consequently, when the variable capacitor is soldered to another circuit board, flux disadvantageously enters the insulating case to deteriorate electric characteristics and obstruct smooth adjusting operation. Further, it has been impossible to wash the variable capacitor with a washing solution after assembling of the same.

The above description is mainly directed to so-called single-sided adjustment type variable capacitor, and the problem is more serious with respect to so-called double-sided adjustment type variable capacitor. That is, two elements corresponding to the metal rotor are provided in the double-sided adjustment variable capacitor, while the insulating case is required to have two openings with respect to the respective metal rotors. Thus, it has been extremely difficult to provide a double-sided adjustment type variable capacitor in sealed structure, and it has been impossible to prevent entrance of flux, dust or humidity.

SUMMARY OF THE INVENTION

An object of the present invention is to provide a variable capacitor having sealed structure. Such variable capacitor according to the present invention allows insertion of the forward end of a tool such as a screwdriver for rotating a metal rotor while maintaining the sealed state, for performing capacity adjustment.

According to the present invention, the variable capacitor which is in sealed structure must allow insertion of a rotating tool while enabling rotation of the metal rotor. Therefore, the metal rotor must be arranged rotatably with respect to the insulating case. Further, the surface of the metal rotor which is formed to be engaged with the rotating tool must be directed toward the opening of the insulating case, while requisitely leaving a free space defined between the subject surface and the opening. As an inevitable consequence, a series of communicating spaces or gaps are defined from the opening of the insulating case to the surroundings of a dielectric plate through the upper spaces of the surface of the metal rotor directed toward the opening and through spaces between the metal rotor and the inner peripheral surface of the insulating case. A particularly significant problem is entrance of foreign bodies such as the aforementioned flux into the gap between the dielectric plate and the metal rotor which is merely in contact with the same. On the other hand, entrance of the foreign bodies into the space between, e.g., the opening of the insulating case and the metal rotor substantially offers no problem, and on the contrary, it is not preferable to close the subject space since such closure of the space obstructs insertion of the rotating tool for capacity adjustment.

From this point of view, a space defined between the metal rotor in the vicinity of the outer peripheral portion of the surface directed toward the opening and a resilient presser member made of metal arranged above the metal rotor is selected as a portion most effective for preventing entrance of the foreign bodies. The resilient presser member comprises a base portion fixedly arranged within the insulating case and provided in the form of a ring not to obstruct insertion of the rotating tool and spring portions integrally extending from the base portion to apply pressure with respect to the metal rotor in the vicinity of the outer periphery of its surface directed toward the opening. Fixedly provided with respect to the base portion of the resilient presser member is an annular sealing member formed by elastic material. When the sealing member is formed by, e.g., resin such as silicone rubber, the base portion of the resilient presser member is previously inserted in a mold for forming the sealing member, for simultaneously performing molding of the sealing member and fixation of the sealing member to the base portion of the resilient presser member. The sealing member blocks a path defined between the surface of the metal rotor directed toward the opening and the peripheral portion of the opening of the insulating case in the vicinity of the outer peripheral portion of the surface of the metal rotor directed toward the opening over the entire circumference. Since the annular sealing member, which is one of the features of the present invention, is formed by elastic material, the metal rotor can be smoothly rotated even if the same is in contact with the metal rotor, whereby capacity adjustment can be performed while maintaining the contact state.

In a preferred embodiment of the present invention, a sealing member is formed to cover spring portions of a resilient presser member, while contact portions of the spring portions which are in contact with the metal rotor are exposed outwardly from the sealing member. The contact surface of the sealing member with respect to the metal rotor is formed to enclose the contact portions of the spring portions. Thus, entrance of foreign bodies in the vicinity of the contact portions of the spring portions is effectively prevented, whereby the contact of the subject contact portions with the metal rotor is ensured.

The above and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
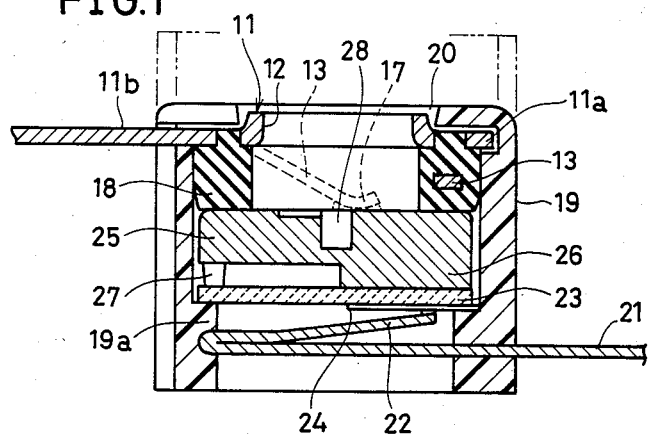
FIG. 1 is a central longitudinal cross-sectional view showing a variable capacitor according to an embodiment of the present invention.
Figure 2:
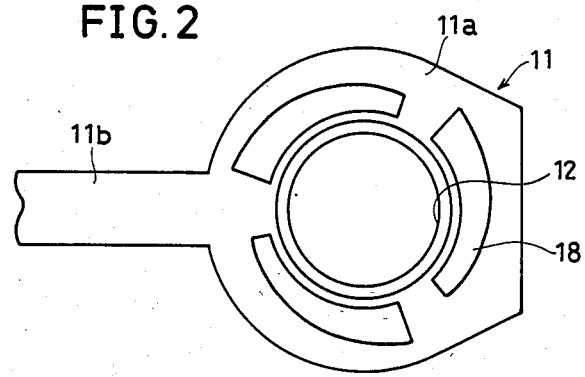
FIG. 2 is a plan view of a resilient presser member 11 included in the variable capacitor as shown in FIG. 1.

In FIG. 1, there is shown a central longitudinal cross-sectional view of a variable capacitor according to a preferred embodiment of the present invention. In the present embodiment, an improvement is applied with respect to a resilient presser member 11 included in the variable capacitor as shown in FIG. 1. Such resilient presser member 11 is shown in FIGS. 2 to 5 in detail.

The resilient presser member 11 is made of appropriate springy metal, and is provided with an opening 12 at its base portion 11a. Around the opening 12, there are provided, e.g., three spring portions 13. The resilient presser member 11 is further integrally provided with a rotor terminal 11b. In the lower surface of the base portion 11a of the resilient presser member 11, there is formed an annular sealing member 18 made of elastic resin such as silicone rubber. This sealing member 18 is integrally formed with the resilient presser member 11, with the base portion 11a of the resilient presser member 11 being inserted in a mold for forming the same. The sealing member 18 is formed in such a manner that the same covers the spring portions 13 while only exposing contact portions 17 thereof.

In assembling of the variable capacitor as shown in FIG. 1, an insulating case 19 is prepared in such a state that the peripheral portion of an opening 20 is raised as shown by phantom lines in FIG. 1. A stator terminal 21 is inserted in a mold for forming the insulating case 19, to be embedded in the bottom wall of the insulating case 19. A spring portion 22 of the stator terminal 21 is exposed within the case, and force is applied to the spring portion 22 to be upwardly repulsive in a springing manner. The forward end portion of the stator terminal 21 is outwardly extracted from the insulating case 19. A dielectric plate 23 is arranged on the bottom shoulder 19a of the insulating case 19, with its lower surface being contact with the spring portion 22 of the stator terminal 21, in a state prevented from rotation within the insulating case 19. A stator electrode 24 is directly formed in the lower surface of the dielectric plate 23, to be elastically in contact with the spring portion 22 of the stator terminal 21. Superposed on the dielectric plate 23 is a metal rotor 25, which is rotatably arranged within the insulating case 19. A rotor electrode 26 is formed in the lower surface of the metal rotor 25 in a projecting manner, while a projecting step 27 is formed in a side reverse to that provided with the rotor electrode 26, for preventing the metal rotor 25 from being inclined by projection of the rotor electrode 26. The metal rotor 25 is further provided in its upper surface with an adjusting groove 28 to be engaged with a tool for rotating the metal rotor 25, e.g., a screwdriver. The adjusting groove 28 is directed toward the opening 20 of the insulating case 19. The base portion 11a of the resilient presser member 11 having the aforementioned sealing member 18 is superposed on the metal rotor 25. When the resilient presser member 11 is assembled into the insulating case 19, the outer peripheral surface of the sealing member 18 is brought into close contact with the inner peripheral surface of the insulating case 19. The sealing member 18 is also brought into close contact with the upper surface of the metal rotor 25 in the vicinity of its outer peripheral portion, while the contact portions 17 of the spring portions 13 exposed in the lower surface of the sealing member 18 come in contact with the upper surface of the metal rotor 25. Such state being maintained, the peripheral edge portion of the opening 20 in the insulating case 19 is deformed to be inwardly bent as shown by solid lines in FIG. 1, which peripheral edge portion is engaged with the base portion 11a of the resilient presser member 11. For performing such steps, the insulating case 19 is preferably formed by thermoplastic resin, and the aforementioned deformation is carried out with application of heat.

In addition to or in place of such utilization of the peripheral edge portion of the opening 20 in the insulating case 19 being deformed, a suitable component may be placed on the base portion 11a of the resilient presser member 11 as a means for preventing disengagement of the resilient presser member 11 from the insulating case 19.

Thus, the variable capacitor according to the present embodiment is maintained in a completely sealed state with the structure as shown in FIG. 1. If not for the sealing member 18, there are two paths through which foreign bodies may enter the variable capacitor. One is a path defined by a gap between the outer peripheral surface of the metal rotor 25 and the inner peripheral surface of the insulating case 19 from the opening 20 of the insulating case 19 through the upper portion of the metal rotor 25. The other is a path defined by a gap in a portion through which the rotor terminal 11b of the resilient presser member 11 is extracted from the insulating case 19 and a gap between the outer peripheral surface of the metal rotor 25 and the inner peripheral surface of the insulating case 19. However, according to the present embodiment, such paths are effectively blocked by the sealing member 18. That is, since the sealing member 18 comes in contact both with the upper surface of the metal rotor 25 in the vicinity of its outer peripheral portion as well as the inner peripheral surface of the insulating case 19, there is absolutely no possibility that the foreign bodies enter the variable capacitor to reach the dielectric plate 23.

Further, in the assembled state as shown in FIG. 1, the contact interface between the sealing member 18 and the metal rotor 25 is adapted to enclose the contact portions 17 of the spring portions 13. By virtue of this, the foreign bodies are prevented from entering the variable capacitor to reach the contact portions 17 of the spring portions 13, whereby the contact portions 17 are reliably brought into contact with the metal rotor 25.

Although the sealing member 18 in the aforementioned embodiment is formed before the resilient presser member 11 is assembled in the insulating case 19, the sealing member 18 may be formed after the resilient presser member 11 is assembled in the insulating case 19 with insertion of an appropriate mold in the insulating case 19. In such a case, potting resin material such as silicone is effectively used as the material for forming the sealing member 18. Such silicone resin is injected in an unhardened state to be hardened in the aforementioned state thereby to enclose the spring portions 13, and is finally fixed to the resilient presser member 11, because the resin forming the sealing member 18 is applied in such a manner that the same covers the spring portions 13 and gets into openings of the base portion 11a which are left as a result of the forming of the spring portions 13. With utilization of such silicone resin, binding force is hardly applied to the metal rotor 25, rotation of which is thus not prevented.

Although the sealing member 18 is also closely in contact with the inner peripheral surface of the insulating case 19 in the aforementioned embodiment, such close contact with the same is not necessarily required.

Figure 4:
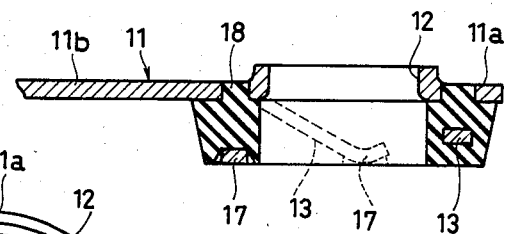
FIG. 4 is a cross-sectional view taken along the line IV—IV in FIG. 3.
Figure 3:
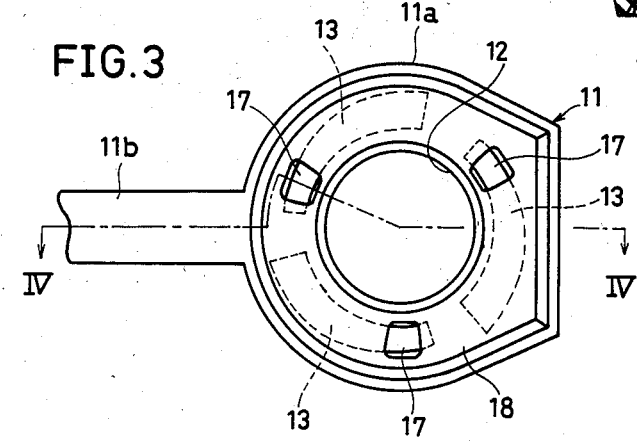
FIG. 3 is a bottom plan view of the resilient presser member 11 as shown in FIG. 2.
Figure 5:
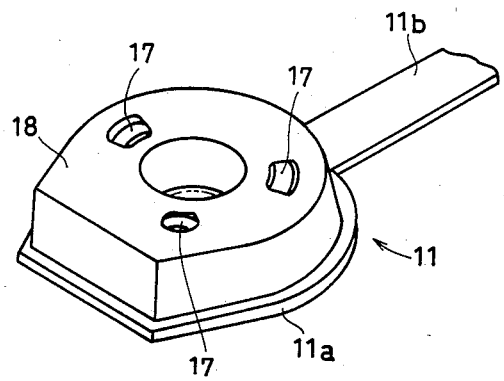
FIG. 5 is a perspective view of the resilient presser member 11 of FIG. 2 as viewed from the bottom direction.

In a case where the sealing member 18 is previously retained by the resilient presser member 11, preferably the outer diameter of the sealing member 18 is designed to be slightly larger in size than the inner diameter of the insulating case 19 for bringing the sealing member 18 also in contact with the inner peripheral surface of the insulating case 19. In this case, the outer peripheral surface of the sealing member 18 is preferably tapered as shown in FIG. 4 for facilitating engagement with the insulating case 19.

Figure 6:
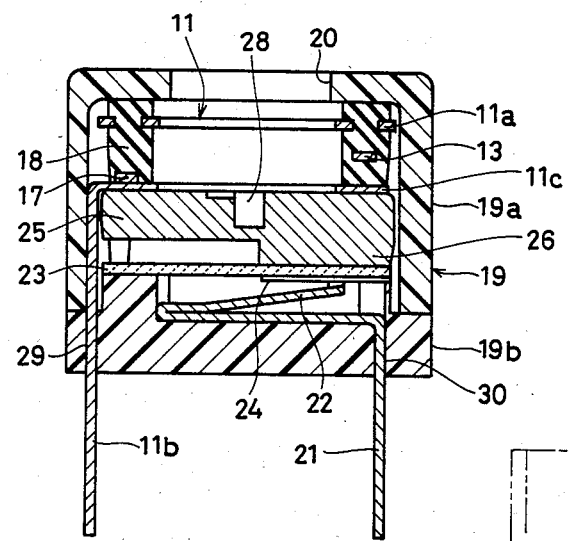
FIG. 6 is a central longitudinal cross-sectional view showing a variable capacitor according to another embodiment of the present invention.

Referring to FIG. 6, another embodiment of the present invention is now described. For facilitating comparison with the aforementioned embodiment as shown in FIG. 1, corresponding components are indicated by the same reference numerals, and description is hereafter made with respect to construction different from that of the above embodiment.

An insulating case 19 in this embodiment is divided into a case body 19a and a bottom wall portion 19b, which are fixedly connected with each other by a binder or a method such as welding after inner elements to be included in the variable capacitor are contained in the insulating case 19. Therefore, the peripheral edge of an opening 20 is in the state as shown in FIG. 6 upon provision of the case body 19a.

A resilient presser member 11 comprises a base portion 11a and spring portions 13 alone, and a rotor terminal 11b is prepared separately therefrom. The rotor terminal 11b has a ring-shaped base portion 11c, which is interposed between a sealing member 18 and a metal rotor 25.

The sealing member 18 is not only provided in the lower surface side of the base portion 11a of the resilient presser member 11 but in the upper surface side thereof, whereby the upper surface of the sealing member 18 is in contact with the lower surface of the peripheral edge of the opening 20 in the insulating case 19.

The bottom wall portion 19b has holes 29 and 30 for respectively receiving the rotor terminal 11b and a stator terminal 21, which are inserted in the holes 29 and 30 in assembling of the variable capacitor. The holes 29 and 30 may be filled with a binder if necessary.

As hereinabove described, some constructive points of the variable capacitor as shown in FIG. 1 are altered in the embodiment as shown in FIG. 6, and the present invention may further be modified to partially employ the altered points.

Figure 7:
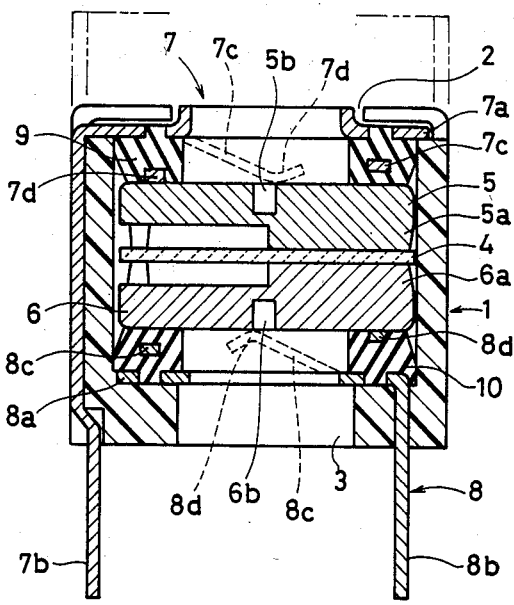
FIG. 7 is a central longitudinal cross-sectional view showing a variable capacitor according to still another embodiment of the present invention.

In FIG. 7, there is shown still another embodiment of the present invention, which is applied to so-called double-sided adjustment type variable capacitor. Referring to FIG. 7, an insulating case 1 is provided in both end surfaces with an upper opening 2 and a lower opening 3 respectively. A dielectric plate 4 is arranged in a substantially central position in the vertical direction within the interior of the insulating case 1. An upper metal rotor 5 and a lower metal rotor 6 are respectively provided with respect to the upper and lower surfaces of the dielectric plate 4. The metal rotors 5 and 6 are respectively provided with electrode portions 5a and 6a to be partially in contact with the dielectric plate 4. Further, adjusting grooves 5b and 6b are respectively formed in the upper surface of the upper metal rotor 5 and the lower surface of the lower metal rotor 6. These adjusting grooves 5b and 6b are respectively directed toward the upper opening 2 and the lower opening 3. An upper resilient presser member 7 is provided over the upper metal rotor 5 while a lower resilient presser member 8 is provided under the lower metal rotor 6. Base portions 7a and 8a of the respective resilient presser members 7 and 8 are annularly formed for enabling rotative operation of the corresponding metal rotors 5 and 6 respectively from the outside. The respective resilient presser members 7 and 8 are integrally provided with terminals 7b and 8b, which are respectively extracted outwardly from the insulating case 1. Further, spring portions 7c and 8c are formed to extend respectively from the resilient presser members 7 and 8 in the direction of the corresponding metal rotors 5 and 6. These spring portions 7c and 8c respectively have contact portions 7d and 8d, which are elastically in contact with the corresponding metal rotors 5 and 6.

In the present embodiment, an improvement is made with respect to the upper and lower resilient presser members 7 and 8. That is, with respect to the upper resilient presser member 7, an annular sealing member 9 is provided to be in contact with the upper surface of the upper metal rotor 5 as well as the inner surface of the insulating case 1. With respect to the lower resilient presser member 8, on the other hand, an annular sealing member 10 is provided to be in contact with the lower surface of the lower metal rotor 6 as well as the inner surface of the insulating case 19. These sealing members 9 and 10 are made of elastic material in a similar manner to the aforementioned sealing member 18, and are assembled with the base portions 7a and 8a and the spring portions 7c and 8c of the respective resilient presser members 7 and 8 also in a similar mode to the above.

Two openings 2 and 3 are provided in the variable capacitor as shown in FIG. 7, and foreign bodies entering either of the openings 2 and 3 may effectively be prevented by the sealing members 9 and 10 from reaching the dielectric plate 4.

Although the present invention has been described and illustrated in detail, it is clearly understood that the same is by way of illustration and example only and is not to be taken by way of limitation, the scope of the present invention being limited only by the terms of the appended claims.

What is claimed is:

1. A variable capacitor comprising:
   an insulating case provided with at least one opening;
   a dielectric plate arranged within said insulating case;
   first and second electrodes arranged within said insulating case to be opposed to each other through said dielectric plate;
   a metal rotor rotatably arranged within said insulating case and provided with said first electrode in its one surface, with the other surface thereof being directed toward said opening;
   a formation means provided in said other surface of said metal rotor for engagement with a tool for rotating said metal rotor;
   a resilient presser member made of metal comprising a base portion fixedly arranged within said insulating case in the side of said other surface of said metal rotor and provided in the form of a ring not to obstruct said formation means and spring portions integrally extending from said base portion for applying pressure with respect to said metal rotor in the vicinity of the outer peripheral portion of said other surface thereof; and an annular sealing member fixed with respect to said base portion of said resilient presser member to block a path defined between said other surface of said metal rotor and the peripheral portions of said opening in the vicinity of the outer periphery of said other surface thereof over the entire circumference, said sealing member being formed by elastic material.

2. A variable capacitor comprising:
an insulating case provided with at least one opening;
a dielectric plate arranged within said insulating case;
first and second electrodes arranged within said insulating case to be opposed to each other through said dielectric plate;
a metal rotor rotatably arranged within said insulating case and provided with said first electrode in its one surface, with the other surface thereof being directed toward said opening;
a formation means provided in said other surface of said metal rotor for engagement with a tool for rotating said metal rotor;
a resilient presser member made of metal comprising a base portion fixedly arranged within said insulating case in the side of said other surface of said metal rotor and provided in the form of a ring not to obstruct said formation means and spring portions integrally extending from said base portion for applying pressure with respect to said metal rotor in the vicinity of the outer peripheral portion of said other surface thereof; and
an annular sealing member fixed with respect to said base portion of said resilient presser member to block a path defined between said other surface of said metal rotor and the peripheral portions of said opening in the vicinity of the outer periphery of said other surface thereof over the entire circumference, said sealing member being formed by elastic material;
wherein said spring portions have contact portions being elastically in contact with said metal rotor, and said sealing member is formed to cover said spring portions, while the contact portions of said spring portions are exposed from said sealing member.

3. A variable capacitor in accordance with claim 2, wherein the contact surface of said sealing member with respect to said metal rotor is formed to enclose said contact portions of said spring portions.

4. A variable capacitor in accordance with claim 2, wherein said sealing member is in contact also with the inner peripheral surface of said insulating case.

5. A variable capacitor in accordance with claim 2, wherein said resilient presser member is integrally provided with a rotor terminal, said rotor terminal being outwardly extracted from said insulating case.

6. A variable capacitor in accordance with claim 2, wherein said resilient presser member is retained in a state elastically in contact with said metal rotor by being in engagement with said insulating case in the vicinity of the peripheral edge portion of said opening.

7. A variable capacitor in accordance with claim 2, wherein said formation means is selected in a form to be engaged with the forward end of a screwdriver.

8. A variable capacitor in accordance with claim 2, wherein said second electrode is fixedly retained within said insulating case.

9. A variable capacitor comprising:
an insulating case provided with at least one opening;
a dielectric plate arranged within said insulating case;
first and second electrodes arranged within said insulating case to be opposed to each other through said dielectric plate;
a metal rotor rotatably arranged within said insulating case and provided with said first electrode in its one surface, with the other surface thereof being directed toward said opening;
a formation means provided in said other surface of said metal rotor for engagement with a tool for rotating said metal rotor;
a resilient presser member made of metal comprising a base portion fixedly arranged within said insulating case in the side of said other surface of said metal rotor and provided in the form of a ring not to obstruct said formation means and spring portions integrally extending from said base portion for applying pressure with respect to said metal rotor in the vicinity of the outer peripheral portion of said other surface thereof; and
an annular sealing member fixed with respect to said base portion of said resilient presser member to block a path defined between said other surface of said metal rotor and the peripheral portions of said opening in the vicinity of the outer periphery of said other surface thereof over the entire circumference, said sealing member being formed by elastic material;
wherein said sealing member is retained by said resilient presser member prior to insertion of said resilient presser member into said insulating case.

10. A variable capacitor comprising:
an insulating case provided with at least one opening;
a dielectric plate arranged within said insulating case;
first and second electrodes arranged within said insulating case to be opposed to each other through said dielectric plate;
a metal rotor rotatably arranged within said insulating case and provided with said first electrode in its one surface, with the other surface thereof being directed toward said opening;
a formation means provided in said other surface of said metal rotor for engagement with a tool for rotating said metal rotor;
a resilient presser member made of metal comprising a base portion fixedly arranged within said insulating case in the side of said other surface of said metal rotor and provided in the form of a ring not to obstruct said formation means and spring portions integrally extending from said base portion for applying pressure with respect to said metal rotor in the vicinity of the outer peripheral portion of said other surface thereof; and
an annular sealing member fixed with respect to said base portion of said resilient presser member to block a path defined between said other surface of said metal rotor and the peripheral portions of said opening in the vicinity of the outer periphery of said other surface thereof over the entire circumference, said sealing member being formed by elastic material;

wherein said sealing member is brought into a state fixed to said resilient presser member with unhardened resin for forming said sealing member being injected and then hardened after insertion of said resilient presser member into said insulating case.

11. A variable capacitor comprising:

an insulating case provided with at least one opening;

a dielectric plate arranged within said insulating case;

first and second electrodes arranged within said insulating case to be opposed to each other through said dielectric plate;

a metal rotor rotatably arranged within said insulating case and provided with said first electrode in its one surface, with the other surface thereof being directed toward said opening;

a formation means provided in said other surface of said metal rotor for engagement with a tool for rotating said metal rotor;

a resilient presser member made of metal comprising a base portion fixedly arranged within said insulating case in the side of said other surface of said metal rotor and provided in the form of a ring not to obstruct said formation means and spring portions integrally extending from said base portion for applying pressure with respect to said metal rotor in the vicinity of the outer peripheral portion of said other surface thereof; and an annular sealing member fixed with respect to said base portion of said resilient presser member to block a path defined between said other surface of said metal rotor and the peripheral portions of said opening in the vicinity of the outer periphery of said other surface thereof over the entire circumference, said sealing member being formed by elastic material;

wherein said insulating case is further provided with a second opening in a position opposed to said opening, said variable capacitor further including:

a second metal rotor rotatably arranged within said insulating case and provided with said second electrode in its one surface with the other surface thereof being directed toward said second opening, a second formation means provided in said other surface of said second metal rotor for engagement with a tool for rotating said metal rotor, a second resilient presser member made of metal comprising a base portion fixedly arranged on said second metal rotor in the side of said other surface of said second metal rotor and provided in the form of a ring not to obstruct said second formation means and spring portions integrally extending from said base portion for applying pressure with respect to said second metal rotor in the vicinity of the outer peripheral portion of said other surface thereof, and an annular second sealing member fixed with respect to said base portion of said second resilient presser member to block a path defined between said other surface of said second metal rotor and the peripheral portion of said second opening in the vicinity of the outer peripheral portion of said other surface thereof over the entire circumference, said second sealing member being formed by elastic material.

* * * * *

UNITED STATES PATENT AND TRADEMARK OFFICE
CERTIFICATE OF CORRECTION

PATENT NO. : 4,594,640

DATED : Jun. 10, 1986

INVENTOR(S) : Tetsuo Tatsumi

It is certified that error appears in the above-identified patent and that said Letters Patent is hereby corrected as shown below:

COVER PAGE:

ASSIGNEE: MURATA MANUFACTURING CO., LTD., JAPAN

Signed and Sealed this

Twenty-seventh Day of January, 1987

Attest:

DONALD J. QUIGG

*Attesting Officer*  *Commissioner of Patents and Trademarks*